United States Patent Office 2,745,422
Patented May 15, 1956

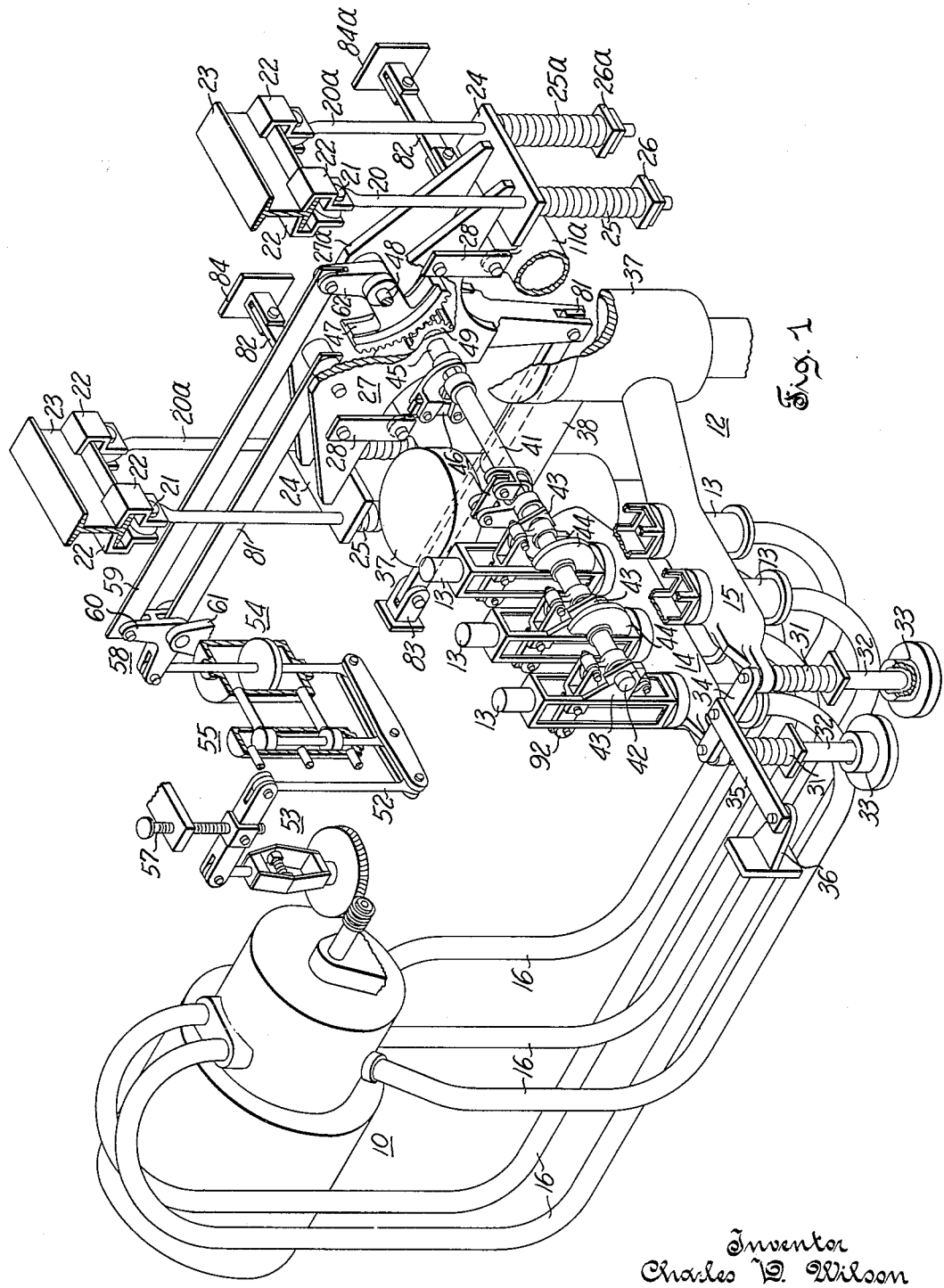

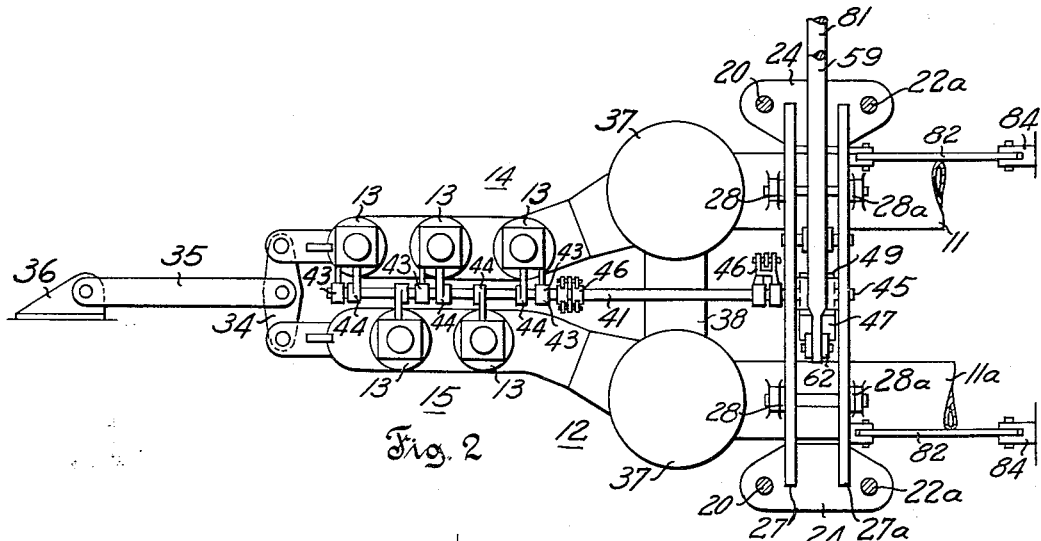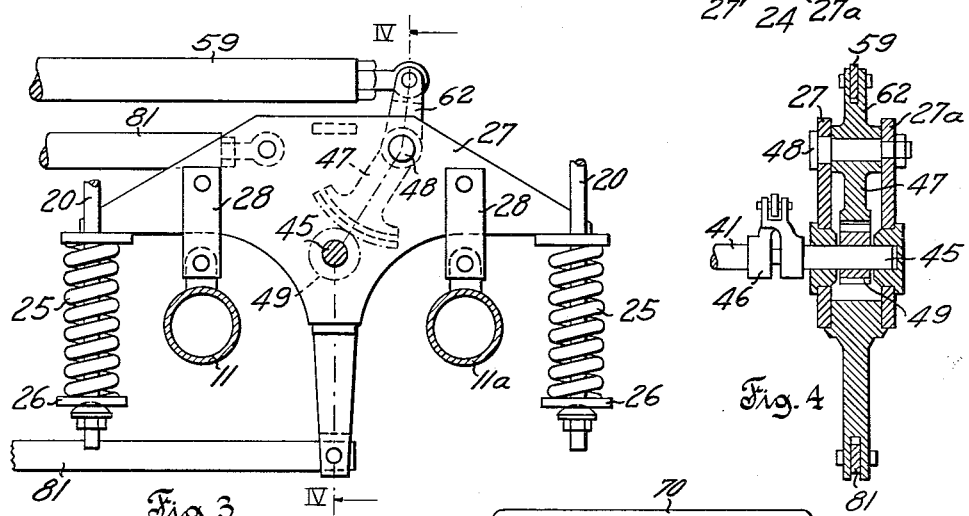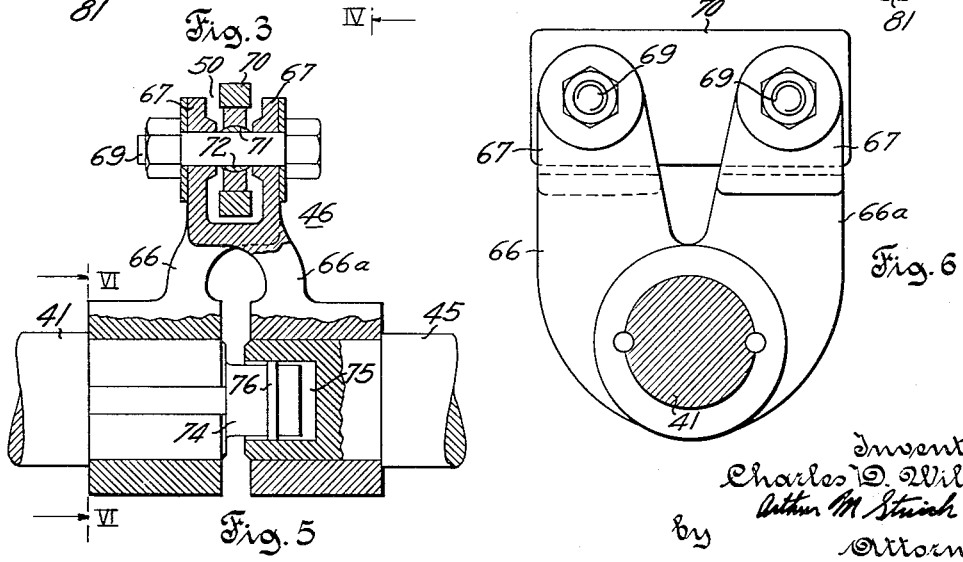

2,745,422
INLET VALVE SUPPORTING AND ACTUATING MEANS FOR ELASTIC FLUID TURBINES

Charles D. Wilson, West Allis, Wis., assignor to Allis-Chalmers Manufacturing Company, Milwaukee, Wis.

Application February 26, 1953, Serial No. 339,074
19 Claims. (Cl. 137—35)

The present invention relates generally to improvements in elastic fluid turbines and specifically to improved means for supporting and actuating the inlet valves of an elastic fluid turbine.

In the power plant of today the most common type of prime mover is the elastic fluid turbine. It is constructed in a variety of sizes up to 250,000 kw. to run on elastic fluids, such as steam. It is built to operate at pressures up to 2500 p. s. i. and temperatures up to 1100° F. At present the trend is toward even larger turbines operating at even higher steam pressures and temperatures, because at higher temperatures and pressures improved efficiency of operation may be obtained with lower fuel consumption. However, increasing the turbine size, and raising the pressure and temperature introduces problems which cannot satisfactorily be solved with prior art designs of turbines.

For example, to make turbines compact, it has long been the practice to mount certain components, such as inlet valves, directly on the turbine casing. But the use of higher pressures require valve and turbine casings of heavier construction. In addition, the use of higher temperatures require casings of alloy materials. In a turbine, therefore, having direct mounted valves, the combination of heavier alloy casings and higher temperatures results in harmful stresses being induced in the valve and turbine casings. To avoid this, turbine designers have separated the inlet valve assembly from the turbine proper and joined the two by means of fluid conduits. Because space is generally at a premium in power stations it is desirable to mount the separate inlet valve assembly as close as possible to the turbine. This calls for short fluid conduits without much inherent flexibility and raises anew the distortion stress problem, particularly in the connecting conduits and turbine and valve casing portions adjacent thereto.

The present invention proposes to substantially eliminate harmful stresses in the inlet valves, turbine casing and interconnecting conduits due to thermal expansion by mounting the inlet valves for movement relative to the turbine. By flexibly mounting one end of the inlet valve assembly on a cradle which in turn is flexibly mounted on a foundation structure, and by flexibly mounting the other end of the valve assembly for movement relative to the foundation structure, limited movement of the inlet valve assembly is effected relative to the turbine in response to thermal expansion of the turbine, valve assembly and interconnecting conduits.

It is therefore an object of the invention to provide in a thermally expandible elastic-fluid-turbine an improved conduit and inlet valve supporting structure in which the various parts are constructed and arranged in a novel manner to permit expansion of the turbine, conduits and inlet valves in response to a temperature rise without harmful effect to the conduits and inlet valves and/or the turbine.

Another object of the invention is to provide in a thermally expandible elastic-fluid-turbine an improved conduit and inlet valve supporting structure in which the various parts are constructed and arranged in a novel manner to move relative to the turbine to compensate for thermal expansion of the conduit and inlet valve structure and/or the turbine.

Another object of the invention is to provide in a thermally expandible elastic-fluid-turbine an improved floating inlet valve supporting structure in which the various parts are constructed and arranged in a novel manner to transmit valve actuating forces to the inlet valves without inducing harmful stresses in the valve structure and the turbine.

Another object of the invention is to provide in a thermally expandible elastic-fluid-turbine an improved inlet valve supporting structure which is movable relative to the turbine and in which the valve actuating means is operative for any position assumed by the valve structure relative to the turbine.

The present invention contemplates providing, as means for operating inlet valves mounted separately from the turbine and movable relative thereto, an improved valve actuating means having a portion rotatable by a translatable link connected to the speed responsive means of the turbine.

The present invention further contemplates as an object the provision of an improved inlet valve supporting and valve actuating structure operatively interposed between the translatable link and the rotatable portion of the valve actuating means to prevent the valve actuating force from being harmfully applied to the inlet valves.

Another object of the invention is to provide in a thermally expandible elastic-fluid-turbine an improved floating inlet valve support and actuating means structure in which a portion of the valve actuating means may be rotated without rotating the supporting structure.

Another object of the invention is to provide in a thermally expandible elastic-fluid-turbine an improved inlet valve supporting and actuating structure which is movable relative to the turbine without effecting a change in the setting of the inlet valves.

Another object of the invention is to provide in a thermally expandible elastic-fluid-turbine an improved inlet valve supporting and actuating structure in which the setting of the inlet valves is unaffected by a rise in temperature of the inlet valves and/or the turbine.

Another object of the invention is to provide in a thermally expandible elastic-fluid-turbine an improved movable inlet valve supporting and actuating structure in which the inlet valves may be actuated in response to a setting of the turbine speed responsive means without the actuating force moving the supporting structure relative to the turbine.

Other objects will appear hereinafter as a description of the invention proceeds.

The novel features of the invention and how the objects are attained will appear more fully from this specification and the accompanying drawings showing an embodiment of the invention and forming a part of this application, and all of these novel features are intended to be pointed out in the appended claims.

In the drawings:

Fig. 1 is an isometric view of a thermally expandible elastic-fluid-turbine, only a part of which is shown, and an inlet valve supporting and actuating structure embodying the invention;

Fig. 2 is a plan view of the turbine inlet valves and the supporting and actuating structure therefor, the turbine and the conduits connecting the valves with the turbine having been omitted for the sake of clarity;

Fig. 3 is a side elevation view of a portion of the inlet valve supporting structure and actuating structure;

Fig. 4 is a sectional view taken along line IV—IV of Fig. 3 looking in the direction of the arrows;

Fig. 5 is a detail view partly in section of the flexible torque transmitting connection of the inlet valve actuating means;

Fig. 6 is a view taken along line VI—VI of Fig. 5 looking in the direction of the arrows.

Figure 7:
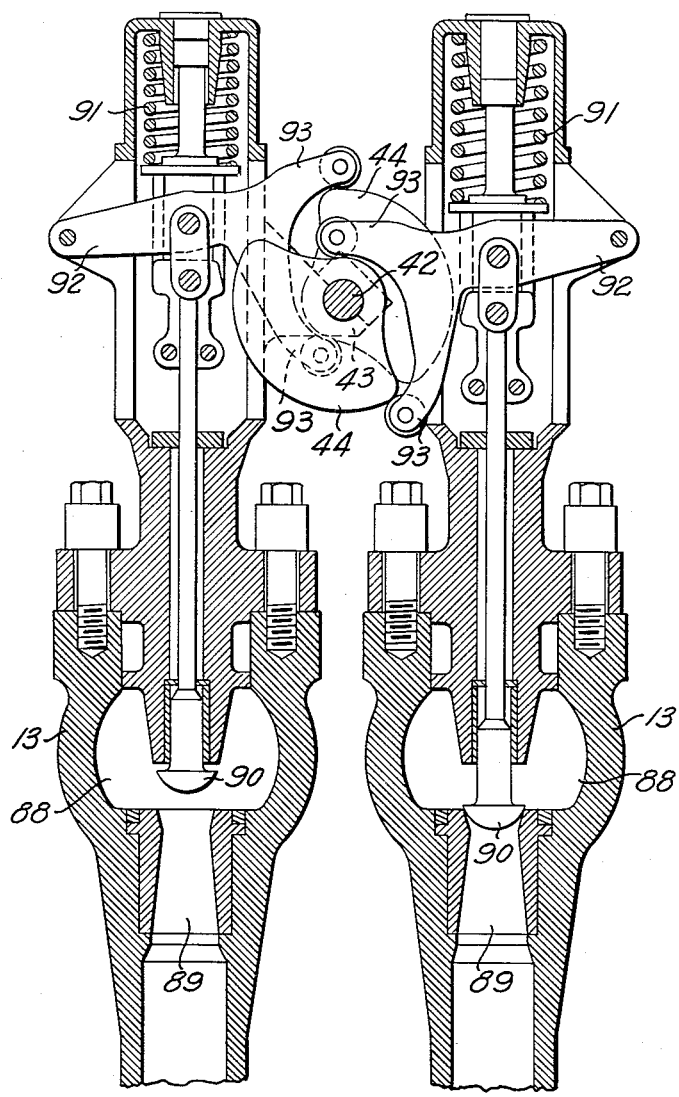
Fig. 7 is an enlarged sectional view of a pair of the turbine inlet valves.

As shown in the drawings and in Fig. 1 in particular, a thermally expandable elastic-fluid-turbine 10 is shown mounted on a foundation structure. The term foundation structure is defined as the permanent rigid structures to which the turbine and certain of the turbine components are secured. A motive fluid supply means connects the turbine to a source of motive fluid (not shown). The motive fluid supply means comprises one or more motive fluid delivery conduits 11, 11a connected to turbine inlet valve means shown as an assembly 12 of several valves 13.

The inlet valves 13 are assembled in two groups 14, 15, each group being respectively connected to one of the conduits 11, 11a. The valve assembly 12 may include a pair of quick closing emergency stop valves 37 positioned between the conduits 11, 11a and the valve groups 14, 15. The stop valves 37 may be connected by a cross connection 38. The construction and operation of the stop valves 37 form no part of the present invention but are merely diagrammatically indicated to show that these valves may be included in an assembly with the turbine inlet valves. The inlet valve assembly 12 is spaced apart from the turbine 10 and is connected to the turbine by conduits 16. A floating support structure is provided for supporting the valve assembly 12 for movement relative to the turbine 10.

The support structure for supporting the valve assembly 12 comprises first support means shown as a pair of depending parallel rod members 20. Each member 20 is flexibly connected at its upper end by a pin 21 passing through the rod and a bracket 22 attached to a horizontal beam 23 of the foundation structure. The lower end of each of the rods 20 passes through a plate 24 and through a coil spring 25. A disk 26 is secured to the free lower end of the rod 20 to retain the spring in place between the plate and the rod end. A member 27 is carried for movement relative to the beams 23 by the plates 24 and may be secured by welding the plates 24 to the member 27.

Second support means shown as a second pair of rod members 28 are pivotally connected at one of their ends to the member 27 and pivotally connected at the other of their ends to the conduits 11, 11a. The rod members 28 support one end of the valve assembly 12 for movement relative to the beams 23. It may be desired to provide a second member 27a in spaced parallel arrangement with the member 27 and it is therefore to be understood that reference to the member 27 is meant to include either the single or double member 27, 27a. Additional pairs of rod members 20a my also be provided if the weight of the supported apparatus requires such additional support. The other end of the valve assembly 12 is supported by a pair of springs 31 mounted on a third pair of rod members 32. The rod members 32 are pivotally supported by elements 33 of the support structure and are connected to the valve groups 14, 15 respectively to support this end of the valve assembly 12 for movement relative to supporting structure.

To prevent tipping of the third pair of rod members 32 which would place an excessive strain on the second pair of rod members 28, a crossbar 34 pivotally interconnects each of the valve groups 14, 15, and another bar 35 pivotally connects a center portion of the crossbar 34 with an element 36 secured to the foundation structure. Unequal expansion of the two groups 14, 15 of valves 13 will pivot the crossbar 34 about the bar 35 and the element 36 but will not cause excessive strain on their respective connections.

Valve actuating means for controlling opening and closing of the valves 13 comprise a cam shaft 41 having a first portion 42 journaled in bearings 43 supported by the valve assembly 12. The bearings 43 are supported by only one group 14 of the valve assembly 12. This arrangement is preferred to prevent binding of the cam shaft 41 in the bearings 43 if the conduits 11, 11a and the connected valve groups 14, 15 do not expand uniformly. The cam shaft 41 has secured thereto a plurality of cams 44. Each of the cams 44 operatively engages with one of the valves 13 to operate the valve upon rotation of the cam shaft, as will appear later with particular reference to Fig. 7. It is the usual practice in this art to design the cams 44 to open and close the valves a predetermined amount and in a predetermined order upon a predetermined rotation of the cam shaft.

A second portion 45 of the cam shaft 41 is journaled in the member 27. The second portion 45 is connected to the first portion 42 of the cam shaft by one or more flexible torque transmitting connections 46. Additional means comprising a gear segment 47 (see also Figs. 3 and 4) is pivotally attached to the member 27 by a pin 48. The gear segment 47 engages a spur gear 49 secured to the second portion 45 of the cam shaft 41 for rotating the cam shaft to operat the valves.

Speed responsive means for the turbine comprise a governor 53 geared to rotate with the turbine 10. The governor 53 may be of the centrifugal weight operated type. The governor 53 is connected to a fluid operated servomotor 54. A pilot valve 55 is provided for controlling the flow of motive fluid to the servomotor 54. The governor 53, servomotor 54 and pilot valve 55 are interconnected by a control linkage 52. A manually adjustable control 57 is provided in the control linkage 52 for operating the pilot valve 55 and the servomotor 54 independently of the governor 53. The servomotor 54 may be connected to the gear segment 47 by a mechanical linkage 58. The linkage 58 may comprise as shown a translatable link 59 connected at one of its ends to a crank lever 60. The crank lever 60 is in turn pivotally connected to the servomotor 54. The crank lever 60 is pivotally attached to a supporting element 61 of the foundation structure. The other end of the link 59 is connected to a crank 62. Crank 62 is secured to the gear segment 47 to pivot with the gear segment.

As shown in Figs. 5 and 6, the flexible torque transmitting connection for connecting the portions 42, 45 of the cam shaft 41, may be of any suitable construction such as a pair of levers 66, 66a keyed to the respective ends of the shaft portions to be coupled, each lever having a bifurcated offset end portion 67 provided with a hole 68 to receive a bolt 69. The levers 66, 66a are mounted on the shafts to be coupled in such manner that the bifurcated ends 67 of both levers 66, 66a lie in a common plane perpendicular to the axis of the shaft portions to be coupled. A link 70 formed with a spherical socket 71 near each end and having a ball 72 disposed in each socket in articulate relation with the link, is disposed in the notches 50 formed by the bifurcation of the ends 67 of the levers 66, 66a. The balls 72 are held rigid relative to the levers 66, 66a by means of the bolts 69, and the link 70 is permitted to move relative to the balls 72 and the levers 66, 66a within limits determined by the clearance between the link 70 and the sides of the notches 50. One of the shaft portions to be coupled is shown provided with an annular protuberance 74 of less diameter than the diameter of the shaft. The other shaft is provided with an annular recess 75 of less inside diameter than the diameter of the shaft but of slightly larger inside diameter than the outside diameter of protuberance 74. An annular shoulder 76 is provided on the protuberance 74 having a diameter approximately equal to the inside diameter of the recess 75 to provide flexible engagement of the shaft portions. It will therefore be apparent that the torque transmitting relation of the portion 45 of the cam shaft 41 and the linkage 58, and the portion 42 of the cam shaft carried by the valve assembly 12, will be maintained for all positions of the member 27 relative to the valve assembly 12.

As shown in Figs. 1, 2 and 3, guide means comprising a first pair of guide bars 81 and a second pair of guide bars 82, are arranged to interconnect the member 27 and elements 83, 84 of the foundation structure for guiding and limiting the member 27 to translatory movement. As will appear the guiding and limiting of the member 27 to translatory movement in a vertical plane will prevent any rotation of the member 27 in response to a pushing or pulling movement of the link 59 and will permit the desired rotation of the valve adjusting cam shaft 41. Furthermore, the guiding and limiting of the member 27 to translatory movement in a horizontal plane will prevent excessive straining of the link 59 and the first pair of guide bars 81.

Movement of the member 27 in a vertical plane will be guided and limited to translatory movement by the first pair of guide bars 81 which interconnect vertically spaced points on the member 27 with element 61 of the foundation structure. The guide bars 81 are arranged to be parallel to each other and generally parallel to the link 59. Since pushing or pulling of the link 59 by the servomotor 54 may involve a considerable force, it will be possible for the member 27 to be pushed down or pulled up the link 59. Such movement of member 27, however, will be limited by the guide bars 81 so that the force of the push or pull of link 59 cannot cause a turning movement of the member 27 which would neutralize the intended rotation of the valve adjusting cam shaft 41. As the member 27 is pushed down or pulled up by the link 59, guide bars 81 will also horizontally displace the member 27 to a slight degree. Inherent flexibility of the rods 20 and a rather loose fit of the pin 21 in the bracket 22 will present little resistance to this movement of the member 27.

In addition to vertical movement and horizontal movement in a vertical plane, of the member 27 by forces applied to the link 59 by the servomotor 54, the servomotor pulling of link 59 may also cause the member 27 and the bars 81 to rotate in a generally horizontal plane. This generally horizontal turning of member 27 will be accompanied by only a small vertical displacement because of the resilient connection provided by the springs 25 between the rods 20 and the member 27. A twisting movement of the member 27 might strain the bars 81 to a degree that would permanently deform and impair their effective operation. To prevent excessive twisting of the member 27 in a generally horizontal plane, the second pair of guide bars 82 interconnect horizontally spaced points on the member 27 and horizontally spaced elements 84, 84a of the foundation structure.

As shown in Fig. 7, a pair of cam operated turbine inlet valves 13 is shown. One of the valves 13 is shown in an open position and the other valve is shown in a closed position. Motive fluid is admitted to an inner chamber 88 in each of the valves from the respective conduits 11, 11a. A fluid outlet 89 may be closed by a plug 90 biased to a closed position by a spring 91. A cam follower 92 is connected to the plug 90 to move the plug against the bias of the spring 91 to open the valve. The cam follower 92 may have a pair of fingers 93 for following oppositely disposed portions of the cam surfaces. This arrangement provides positive closing of the valves in the event that the plug 90 sticks in an open position and cannot be moved to a closed position by the action of the spring 91 alone. As has been stated hereinbefore, it is the usual practice to position the cams 44 so that a predetermined rotation of the cam shaft 41 opens the valves 13 a predetermined amount and in a predetermined order.

During periods when the turbine is being started and brought up to operating temperature, considerable thermal expansion of the turbine's motive fluid supply means will take place. Changes in load upon the turbine with a corresponding change in the flow of motive fluid to the turbine will also result in thermal expansion or contraction of the various parts of the turbine motive fluid supply means. The present invention has been shown to provide support for an inlet valve assembly 12 which permits the valve assembly to move relative to the turbine and the turbine's foundation structure, to relieve stresses in the conduits 11, 11a, 16 and valve assembly 12 resulting from expansion and contraction of this apparatus. The present invention has also been shown to provide movable support for the gear segment 47, one end of the link 59, and the second portion 45 of the cam shaft 41, and a flexible torque transmitting connection 46 between the second portion 45 and first portion 42 of the crank shaft, so that an adjustment of the inlet valves 13 called for by the speed governor 53 will be accurately and rapidly made, no matter what position the valve assembly 12 and the member 27 have assumed relative to each other and relative to the foundation structure. The present invention has also been shown to provide means for guiding and limiting the movement of the member 27 so that a push or pull applied to the link 59 by the servomotor 54 will not rotate the member 27 rather than the cam shaft 41, and will not move the valve assembly 12 to such an extent that excessive bending stresses will be set up in the conduits 11, 11a, 16. The push or pull on link 59 will therefore make the intended adjustment of the inlet valves 13. Movement of the member 27 is permitted so as to minimize strains and stress, and the movement is guided and limited to provide controlled floating movement of the entire apparatus. These and other features and advantages will be obvious to those skilled in this art. It will also be obvious to those skilled in this art that the illustrated embodiment of the invention provides a new and improved means of supporting and operating inlet valves for an elastic fluid turbine and accordingly accomplishes the objects of the invention. On the other hand it will also be obvious to those skilled in the art that the illustrated embodiment of the invention may be variously changed and modified, or features thereof, singly or collectively, embodied in other combinations than that illustrated, without departing from the spirit of the invention, or sacrificing all of the advantages thereof, and that accordingly the disclosure herein is illustrative only and the invention is not limited thereto.

It is claimed and desired to secure by Letters Patent:

1. In combination, an elastic fluid operated turbine; motive fluid supply means connecting said turbine to a source of motive fluid, said fluid supply means including valve means operable to control the flow of motive fluid to said turbine; first support means flexibly connected to foundation structure; a member supported by said first support means in spaced relation to said foundation structure for movement relative to said foundation structure; and second support means flexibly connected to said member and said valve means for supporting said valve means in variable spaced relation to said member whereby said valve means are supported for movement relative to said foundation.

2. In combination, an elastic fluid operated turbine; motive fluid supply means connecting said turbine to a source of motive fluid, said fluid supply means including valve means operable to control the flow of motive fluid to said turbine; first support means flexibly connected to foundation structure; a member supported by said first support means in spaced relation to said foundation structure for movement relative to said foundation structure; and second support means flexibly connected to said member and said valve means for supporting said valve means in variable spaced relation to said member whereby said valve means are supported for movement relative to said foundation in response to thermal expansion and contraction of said fluid supply means.

3. In combination, an elastic fluid operated turbine; motive fluid supply means connecting said turbine to a source of motive fluid, said fluid supply means including valve means operable to control the flow of motive fluid to said turbine; first support means flexibly connected to foundation structure; a member resiliently connected to said first support means for supporting said member in spaced relation to said foundation structure for movement relative to said foundation structure; and second support means flexibly connected to said member and said valve means for supporting said valve means in variable spaced relation to said member whereby said valve means are supported for movement relative to said foundation.

4. In combination, an elastic fluid operated turbine; motive fluid supply means connecting said turbine to a source of motive fluid, said fluid supply means including valve means operable to control the flow of motive fluid to said turbine; first support means flexibly connected to foundation structure; a member resiliently supported for movement in a generally horizontal plane by a pair of springs connected to said first support means; and second support means flexibly connected to said member and said valve means for supporting said valve means in variable spaced relation to said member whereby said valve means are supported for movement relative to said foundation.

5. In combination, an elastic fluid operated turbine; motive fluid supply means connecting said turbine to a source of motive fluid, said fluid supply means including valve means operable to control the flow of motive fluid to said turbine; a first pair of parallel rod members flexibly connected to foundation structure; a member supported by said first rod members in generally horizontal and spaced relation to said foundation structure for movement relative to said foundation structure; and a second pair of parallel rod members flexibly connected at one end to said member and flexibly connected at the other end to said valve means for supporting said valve means in variable spaced relation to said member whereby said valve means are supported for movement relative to said foundation.

6. In combination, an elastic fluid operated turbine; motive fluid supply means connecting said turbine to a source of motive fluid, said fluid supply means including valve means operable to control the flow of motive fluid to said turbine; a first pair of parallel rod members flexibly connected to foundation structure; a member supported by said first rod members in generally horizontal and spaced relation to said foundation structure for movement relative to said foundation structure; and a second pair of parallel rod members each pivotally connected on one end to said member and pivotally connected on their other end to said valve means for supporting said valve means in variable spaced relation to said member whereby said valve means are supported for movement relative to said foundation.

7. In combination, an elastic fluid operated turbine; motive fluid supply means connecting said turbine to a source of motive fluid, said fluid supply means including valve means operable to control the flow of motive fluid to said turbine; a pair of first parallel rod members flexibly connected to foundation structure; a member resiliently supported for movement in a generally horizontal plane by a pair of springs, each of said springs being connected to one of said first rod members; and a pair of second rod members each pivotally connected on one end to said member and pivotally connected on their other end to said valve means for supporting said valve means in variable spaced relation to said member whereby said valve means are supported for movement relative to said foundation.

8. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, flexible torque transmitting means connecting said first and said second portions of said valve actuating means, and additional means for rotating said second portion of said valve actuating means whereby rotation of said second portion will cause like rotation of said first portion for all relative positions of said first and second portions.

9. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member and said valve means supported by said first support means in spaced relation to said foundation structure for movement relative to said foundation structure, and second support means flexibly connected to said member for supporting said valve means in variable spaced relation to said member; valve actuating means for operating said valve means in a predeterminetd manner, said valve actuating means comprising a cam shaft having a first portion journaled in bearings supported by said valve means and a second portion journaled in said member, said first portion having cams operatively engaging said valve means to operate said valve means in said predetermined manner upon rotation of said first portion, flexible torque transmitting means connecting said first and said second portions of said valve actuating means, and additional means for rotating said second portion of said valve actuating means whereby rotation of said second portion will cause like rotation of said first portion for all relative positions of said first and second portions.

10. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation sturcture, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said manner, flexible torque transmitting means connecting said first and said second portions of said valve actuating means, and additional means supported by said member and engaging said second portion for rotating said second portion of said valve actuating means whereby rotation of said second portion will cause like rotation of said first portion for all relative positions of said first and second portions.

11. In combination, an elastic fluid operated turbine;

motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, flexible torque transmitting means connecting said first and said second portions of said valve actuating means, and additional means pivotally attached to said member and engaging said second portion for rotating said second portion of said valve actuating means whereby rotation of said sceond portion will cause like rotation of said first portion for all relative positions of said first and second portions.

12. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, flexible torque transmitting means connecting said first and said second portions of said valve actuating means, additional means supported by said member and engaging said second portion for rotating said second portion of said valve actuating means, and speed responsive means associated with said turbine and connected with said additional means for operating said valve means in said predetermined manner in response to speed variations of said turbine.

13. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, flexible torque transmitting means connecting said first and said second portions of said valve actuating means, additional means pivotally attached to said member and engaging said second portion for rotating said second portion of said valve actuating means, speed responsive means associated with said turbine, and a translatable linkage interconnecting said speed responsive means and said additional means for operating said valve means in said predetermined manner in response to speed variations of said turbine.

14. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation, a member supported by said first support means in spaced relation to said foundation structure for movement relative to said foundation structure, and second support means flexibly connected to said member for supporting said valve means in variable spaced relation to said member; valve actuating means for operating said valve means in a predetermined manner, said valve actuating means comprising a cam shaft having a first portion journaled in bearings supported by said valve means and a second portion journaled in said member, said first portion having cams operatively engaging said valve means to operate said valve means in said predetermined manner upon rotation of said first portion, flexible torque transmitting means connecting said first and said second portions of said valve actuating means, additional means pivotally attached to said member and engaging said second portion for rotating said second portion of said valve actuating means, speed responsive means associated with said turbine, and a translatable linkage interconnecting said speed responsive and said additional means for operating said valve means in said predetermined manner in response to speed variations of said turbine.

15. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation structure, a member supported by said first support means in spaced relation to said foundation structure for movement relative to said foundation structure, second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, and flexible torque transmitting means connecting said first and said second portions of said valve actuating means; speed responsive means associated with said turbine; a mechanical linkage connecting said speed responsive means to said second portion of said valve actuating means for operating said valve actuating means in said predetermined manner in response to speed variations of said turbine, said mechanical linkage being pivotally supported by said foundation structure and said member; and guide means connecting said member to said foundation structure for guiding and limiting movement of said member to translatory movement.

16. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation structure, a member supported by said first support means in spaced relation to said foundation structure for movement relative to said foundation structure, second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, and flexible torque transmitting means connecting said first and said second portions of said valve actuating means; speed responsive means associated with said turbine; a mechanical linkage connecting said speed responsive means to said second portion of said valve actuating means for operating said valve actuating means in said predetermined manner in response to speed variations of said turbine, said mechanical linkage being pivotally supported by said foundation structure and said member; and a pair of parallel guide bars interconnecting vertically spaced points on said member and said foundation structure for guiding and limiting vertical movement of said member to translatory movement.

17. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation structure, a member supported by said first support means in spaced relation to said foundation structure for movement relative to said foundation structure, second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, and flexible torque transmitting means connecting said first and said second portions of said valve actuating means; speed responsive means associated with said turbine; a mechanical linkage connecting said speed responsive means to said second portion of said valve actuating means for operating said valve actuating means in said predetermined manner in response to speed variations of said turbine, said mechanical linkage being pivotally supported by said foundation structure and said member; a first pair of parallel guide bars interconnecting vertically spaced points on said member and said foundation structure for guiding and limiting vertical movement of said member to translatory movement; and a second pair of parallel guide bars interconnecting horizontally spaced points on said member and said foundation structure for guiding and limiting horizontal movement of said member to translatory movement.

18. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation structure, a member supported by said first support means in spaced relation to said foundation structure for movement relative to said foundation structure, second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in a predetermined manner upon rotation of said first portion, said valve actuating means having a second portion journaled in said member, and flexible torque transmitting means connecting said first and said second portions of said valve actuating means; speed responsive means associated with said turbine; a mechanical linkage connecting said speed responsive means to said second portion of said valve actuating means for operating said valve actuating means in said predetermined manner in response to speed variations of said turbine, said mechanical linkage having a link supported for translatory movement relative to said foundation structure; and a pair of guide bars in parallel arrangement to each other and generally parallel to said link, said pair of bars interconnecting vertically spaced points on said member and said foundation structure for guiding and limiting vertical movement of said member to translatory movement.

19. In combination, an elastic fluid operated turbine; motive fluid supply means connecting said turbine to a source of motive fluid, said fluid supply means including valve means operable to control the flow of motive fluid to said turbine; support structure for supporting said valve means for movement relative to foundation structure, said support structure including first support means flexibly connected to said foundation structure, a member supported by said first support means in spaced relation to said foundation structure for movement relative to said foundation structure, second support means flexibly connected to said member for supporting said valve means in variable spaced relation to said member; valve actuating means for operating said valve means in a predetermined manner, said valve actuating means including a first portion journaled in bearings supported by said valve means, said first portion being connected to said valve means to operate said valve means in said predetermined manner upon rotation of said first portion, said valve actuating means having a second portion journaled in said member, and flexible torque transmitting means connecting said first and said second portions of said valve actuating means; speed responsive means associated with said turbine; a mechanical linkage connecting said speed responsive means to said second portion of said valve actuating means for operating said valve actuating means in said predetermined manner in response to speed variations of said turbine, said mechanical linkage having a link supported for translatory movement relative to said foundation structure and said member; a first pair of guide bars in parallel arrangement to each other and generally parallel to said link, said first pair of bars interconnecting vertically spaced points on said member and said foundation structure for guiding and limiting vertical movement of said member to translatory movement; and a second pair of guide bars interconnecting horizontally spaced points on said member to said foundation structure for guiding and limiting horizontal movement of said member to translatory movement.

References Cited in the file of this patent

UNITED STATES PATENTS 2,646,811    Kenney _____ July 28, 1953

FOREIGN PATENTS 505,350    Great Britain _____ May 9, 1939